United States Patent
Kim

(10) Patent No.: US 11,403,322 B2
(45) Date of Patent: Aug. 2, 2022

(54) APPARATUS AND METHOD FOR INTEGRATED MANAGEMENT OF DATA IN MOBILE DEVICE, AND MOBILE DEVICE

(71) Applicant: Samsung Electronics Co., Ltd., Suwon-si (KR)

(72) Inventor: Hyun Jun Kim, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 355 days.

(21) Appl. No.: 14/619,472

(22) Filed: Feb. 11, 2015

(65) Prior Publication Data

US 2015/0317378 A1    Nov. 5, 2015

(30) Foreign Application Priority Data

Apr. 30, 2014  (KR) .................. 10-2014-0052837

(51) Int. Cl.
| | | |
|---|---|---|
| *G06F 16/30* | (2019.01) | |
| *G06F 16/28* | (2019.01) | |
| *G06F 16/2458* | (2019.01) | |
| *G06F 16/9535* | (2019.01) | |
| *G06F 16/25* | (2019.01) | |
| *G06N 20/00* | (2019.01) | |

(52) U.S. Cl.
CPC ........ *G06F 16/285* (2019.01); *G06F 16/2471* (2019.01); *G06F 16/254* (2019.01); *G06F 16/9535* (2019.01); *G06N 20/00* (2019.01)

(58) Field of Classification Search
CPC ......... G06F 17/30598; G06F 17/30545; G06F 17/30563; G06F 17/30867; G06F 16/2471; G06F 16/254; G06F 16/285; G06F 16/9535; G06N 99/005; G06N 20/00

See application file for complete search history.

(56) References Cited

U.S. PATENT DOCUMENTS

| | | | |
|---|---|---|---|
| 7,233,933 | B2 | 6/2007 | Horvitz et al. |
| 7,739,210 | B2 | 6/2010 | Horvitz et al. |
| 9,152,694 | B1* | 10/2015 | Padidar ............... G06F 16/285 |
| 2004/0003042 | A1 | 1/2004 | Horvitz et al. |
| 2006/0075034 | A1 | 4/2006 | Lakkala et al. |
| 2007/0071209 | A1 | 3/2007 | Horvitz et al. |

(Continued)

FOREIGN PATENT DOCUMENTS

| | | |
|---|---|---|
| CN | 101057240 A | 10/2007 |
| CN | 101192235 A | 6/2008 |

(Continued)

OTHER PUBLICATIONS

Xia, Feng, et al. "Mobile multimedia recommendation in smart communities: a survey." Access, IEEE 1 (2013): 606-624. (20 pages in English).

(Continued)

*Primary Examiner* — Mahesh H Dwivedi
(74) *Attorney, Agent, or Firm* — NSIP Law

(57) ABSTRACT

An apparatus for integrated management of data in a mobile device, the apparatus including a data collector configured to collect data from one or more clouds, a data processor configured to process the collected data, analyze the processed data, and create an integrated model based on the analysis. The apparatus further includes a data storage configured to store the created integrated model.

21 Claims, 6 Drawing Sheets

(56) References Cited

U.S. PATENT DOCUMENTS

| | | | | |
|---|---|---|---|---|
| 2007/0174490 | A1* | 7/2007 | Choi | H04M 15/00 707/E17.116 |
| 2010/0023394 | A1 | 1/2010 | Yue et al. | |
| 2010/0299376 | A1* | 11/2010 | Batchu | G06F 16/24573 707/805 |
| 2010/0332401 | A1 | 12/2010 | Prahlad et al. | |
| 2010/0332456 | A1* | 12/2010 | Prahlad | G06F 3/0649 707/664 |
| 2011/0264663 | A1* | 10/2011 | Verkasalo | G06Q 10/06 707/740 |
| 2012/0131009 | A1* | 5/2012 | Nath | G06Q 30/0282 707/741 |
| 2013/0135323 | A1 | 5/2013 | Cheon et al. | |
| 2013/0198119 | A1* | 8/2013 | Eberhardt, III | G06N 20/00 706/12 |
| 2013/0212214 | A1* | 8/2013 | Lawson | G06Q 10/06315 709/217 |
| 2013/0227683 | A1* | 8/2013 | Bettini | G06F 21/57 726/22 |
| 2013/0263289 | A1 | 10/2013 | Vijayan et al. | |
| 2014/0032691 | A1* | 1/2014 | Barton | H04L 41/00 709/206 |
| 2014/0074760 | A1 | 3/2014 | Boldyrev et al. | |
| 2014/0081903 | A1* | 3/2014 | Koosel | G06F 16/254 707/602 |
| 2014/0330881 | A1* | 11/2014 | Stone | G06Q 30/0267 709/201 |
| 2014/0336785 | A1* | 11/2014 | Asenjo | G05B 19/4185 700/17 |
| 2014/0365944 | A1* | 12/2014 | Moore | H04L 67/104 715/772 |
| 2015/0262067 | A1* | 9/2015 | Sridhara | G06N 5/04 706/12 |

FOREIGN PATENT DOCUMENTS

| | | |
|---|---|---|
| CN | 101334792 A | 12/2008 |
| CN | 103218442 A | 7/2013 |
| GB | 2465865 A | 6/2010 |
| KR | 2002-0018321 A | 3/2002 |
| KR | 2002-0075318 A | 10/2002 |
| KR | 10-2095-0005751 A | 1/2005 |
| KR | 10-2010-0010736 A | 2/2010 |
| KR | 10-2012-0015726 A | 2/2012 |
| KR | 10-2012-0028885 A | 3/2012 |
| KR | 10-2013-0044278 A | 5/2013 |
| KR | 10-2013-0053070 A | 5/2013 |
| KR | 10-2013-0060917 A | 6/2013 |

OTHER PUBLICATIONS

Extended European Search Report dated Sep. 8, 2015 in counterpart European Application No. 15164002.6. (8 pages in English).

Chinese Office Action dated Feb. 12, 2019 in counterpart Chinese Application No. 201510154413.X (17 pages in English and 11 pages in Chinese).

Summons to Attend Oral Proceedings issued by the European Patent Office on Jul. 15, 2019 in corresponding European Patent Application No. 15164002.6 (13 pages in English).

Result of Consultation issued on Nov. 28, 2019 in corresponding European Patent Application No. 15 164 002.6, pp. 1-14 (14 pages in English).

Chinese Office Action dated Aug. 12, 2019 in corresponding Chinese Patent Application No. 201510154413.X (19 pages in English, 13 pages in Chinese).

Korean Office Action dated Oct. 30, 2020 in counterpart Korean Patent Application No. 10-2014-0052837 (6 pages in Korean, 6 pages in English).

Korean Notice of Allowance dated Apr. 23, 2021 in counterpart Korean Patent Application No. 14/619,472 (2 pages in Korean).

Chinese Office Action dated Jun. 3, 2021 in counterpart Chinese Patent Application No. 201510154413.X (18 pages in English, 13 pages in Chinese).

\* cited by examiner

APPARATUS AND METHOD FOR INTEGRATED MANAGEMENT OF DATA IN MOBILE DEVICE, AND MOBILE DEVICE

CROSS-REFERENCE TO RELATED APPLICATION

This application claims the benefit under 35 USC 119(a) of Korean Patent Application No. 10-2014-0052837, filed on Apr. 30, 2014, in the Korean Intellectual Property Office, the entire disclosure of which is incorporated herein by reference for all purposes.

BACKGROUND

1. Field

The following description relates to an apparatus and a method for integrated management of data in a mobile device, and the mobile device.

2. Description of Related Art

Mobile devices, such as smartphones, are using applications that are distributed by is different service providers. In an increasingly high-tech and matured market, large service providers have built their own platforms, making it uncomfortable for users to use programs and services provided by service providers other than their own. Various service providers are using clouds, which are physical storage spaces connected to a network, to store or to analyze large amounts of users' information for use in providing additional services. However, although suitable for individual services, such cloud environment may not manage and analyze data collectively, thereby causing many problems.

That is, although mobile devices may collect and generate data on their own, effects that may be provided for users by analyzing various types of data are reduced significantly, since data providers are different. For example, in a case where three applications are installed in a mobile device, which provide location information, photo information, and text message information, respectively, each of these applications may separately identify users' personal history information and the like, but may not use such information as integrated information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for integrated management of data in a mobile device, the apparatus including a data collector configured to collect data from one or more clouds, a data processor configured to process the collected data, analyze the processed data, and create an integrated model based on the analysis. The apparatus further includes a data storage configured to store the created integrated model.

The data processor may be configured to classify the collected data into types of data.

The types of data may include any one or any combination of emails, photos, videos, chats, calls, and documents.

The data processor may be configured to generate user characteristic information that includes either one or both of user preferences and user habits, based on the processed data.

The data processor may be configured to apply the generated user characteristic information to a predefined learning algorithm to create the integrated model.

The apparatus may further include a standard-setter configured to set standard information based on a user input.

The standard information may include collecting-standard information that includes any one or any combination of information of the clouds, a collecting time, a collecting interval, and a collecting period, and the data collector may be configured to collect the data from the clouds based on the collecting-standard information.

The standard information may include processing-standard information that includes either one or both of standard formats and standard sizes of types of data, and the data processor may be configured to convert the collected data to satisfy the processing-standard information.

The standard information may include analyzing-standard information that includes either one or both of a data analyzing time and a data analyzing type, and the data processor may be configured to analyze the processed data at every data analyzing time to generate analysis results for the data analyzing type.

The apparatus may further include a data provider configured to provide data based on the stored integrated model in response to a user request for data.

In another general aspect, there is provided a method for integrated management of data in a mobile device, the method including collecting data from one or more clouds, processing the collected data, analyzing the processed data, creating an integrated model based on the analysis, and storing the created integrated model.

The processing of the collected data may include classifying the collected data into types of data.

The analyzing of the processed data may include generating user characteristic information that includes either one or both of user preferences and user habits, based on the processed data.

The creating of the integrated model may include applying the generated user characteristic information to a predefined learning algorithm to create the integrated model.

The method may further include setting standard information based on a user input.

The standard information may include collecting-standard information that includes any one or any combination of information of the clouds, a collecting time, a collecting interval, and a collecting period, and the collecting of the data may include collecting the data from the clouds based on the collecting-standard information.

The standard information may include processing-standard information that includes either one or both of standard formats and standard sizes of types of data, and the processing of the collected data may include converting the collected data to satisfy the processing-standard information.

The standard information may include analyzing-standard information that includes either one or both of a data analyzing time and a data analyzing type, and the analyzing of the processed data may include analyzing the processed data at every data analyzing time to generate analysis results for the data analyzing type.

The method may further include providing data based on the stored integrated model in response to a user request for data.

In still another general aspect, there is provided a mobile device, including a controller configured to control a communication module to be connected to a communication network, and a communicator configured to access one or more clouds through the connected communication network. The mobile device further includes an integrated data manager configured to collect data from the accessed clouds, process the collected data, analyze the processed data, and create an integrated model based on the analysis.

The integrated data manager may be further configured to set standard information that includes any one or any combination of a collecting standard, a processing standard, and an analyzing standard based on a user input, to collect, process, and analyze the data based on the set standard information.

The integrated data manager may be further configured to output data to a display based on the created integrated model in response to a user request for data.

In yet another general aspect, there is provided an apparatus, including a processor configured to collect data from one or more clouds, process the collected data, analyze the processed data, and create an integrated model based on the analysis.

The processor may be configured to collect the data based on any one or any combination of information of the clouds, a collecting time, an interval, and a period, process the collected data based on any one or any combination of types of data, formats of the types of data, and sizes of the types of data, and analyze the processed data based on any one or any combination of user preferences, user habits, and an analyzing time.

The processor may be configured to apply results of the analysis to a predefined learning algorithm to create the integrated model.

Other features and aspects will be apparent from the following detailed description, the drawings, and the claims.

Figure 1:
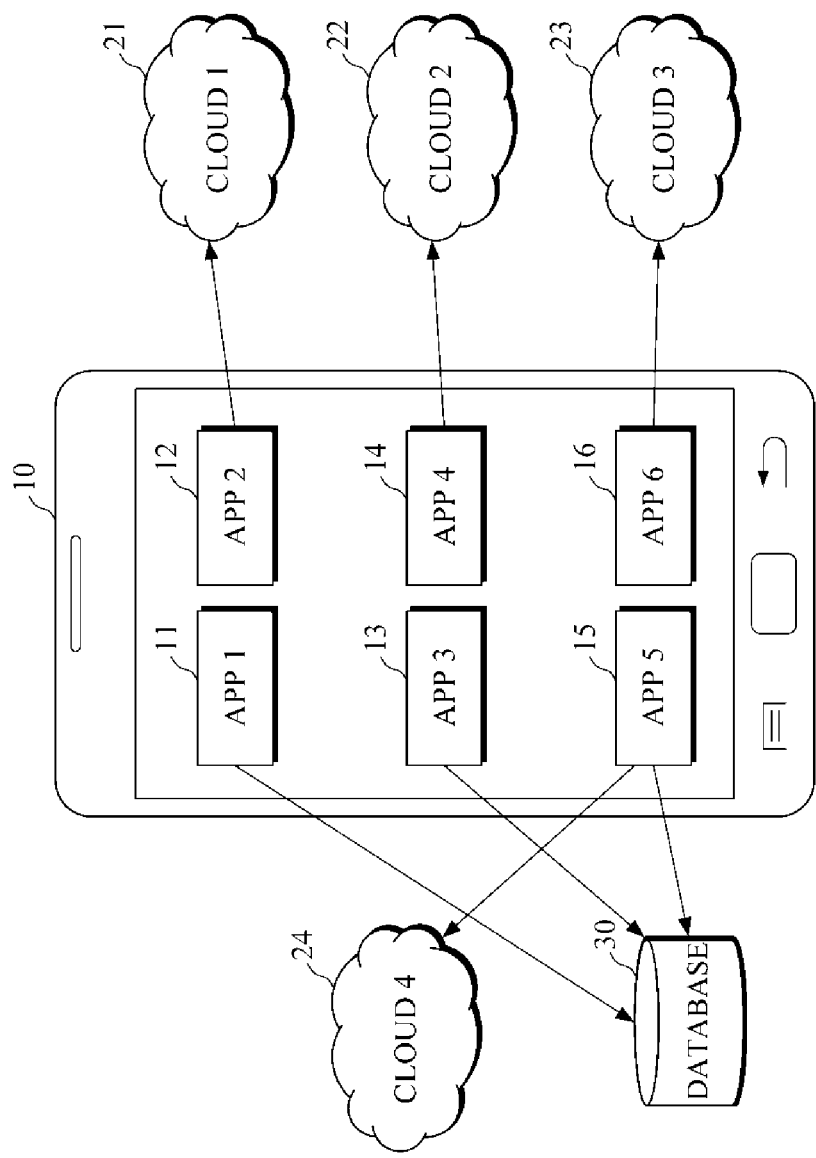
FIG. 1 is a block diagram illustrating data management in a conventional mobile device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating data management in a conventional mobile device 10. Referring to FIG. 1, a plurality of applications 11, 12, 13, 14, 15, and 16, which provide various functions, are generally installed in the mobile device 10 for users. The plurality of applications 11, 12, 13, 14, 15, and 16 may be applications that perform basic functions, such as, for example, calling and transmitting text messages, or may be applications installed additionally by a user, which perform various functions, such as, for example, implementing mVoIP-based chats, capturing photographs or videos, writing documents, and transmitting emails.

As illustrated in FIG. 1, data processed in the applications 11, 13, and 15 may be stored directly in a database 30 connected to the mobile device 10. The database 30 may be provided in an external hardware device, e.g., a computer, a tablet PC, and a laptop computer, which is connected to the mobile device 10 through wired or wireless communication. However, the database 30 is not limited thereto, and if performance (e.g., storage capacity) of the mobile device 10 is sufficient, the database 30 may be provided in the mobile device 10.

Further, data processed in the applications 12, 14, 15, and 16 may be stored in clouds 21, 22, 23, and 24, respectively, which are managed by providers of these application services, as illustrated in FIG. 1. As described above, a conventional mobile environment is inconvenient in that, if a user wishes to check previously processed data, the user should execute each of the applications 11, 12, 13, 14, 15, and 16, or access the database 30 and the clouds 21, 22, 23, and 24 one by one, where each data is stored.

Figure 2:
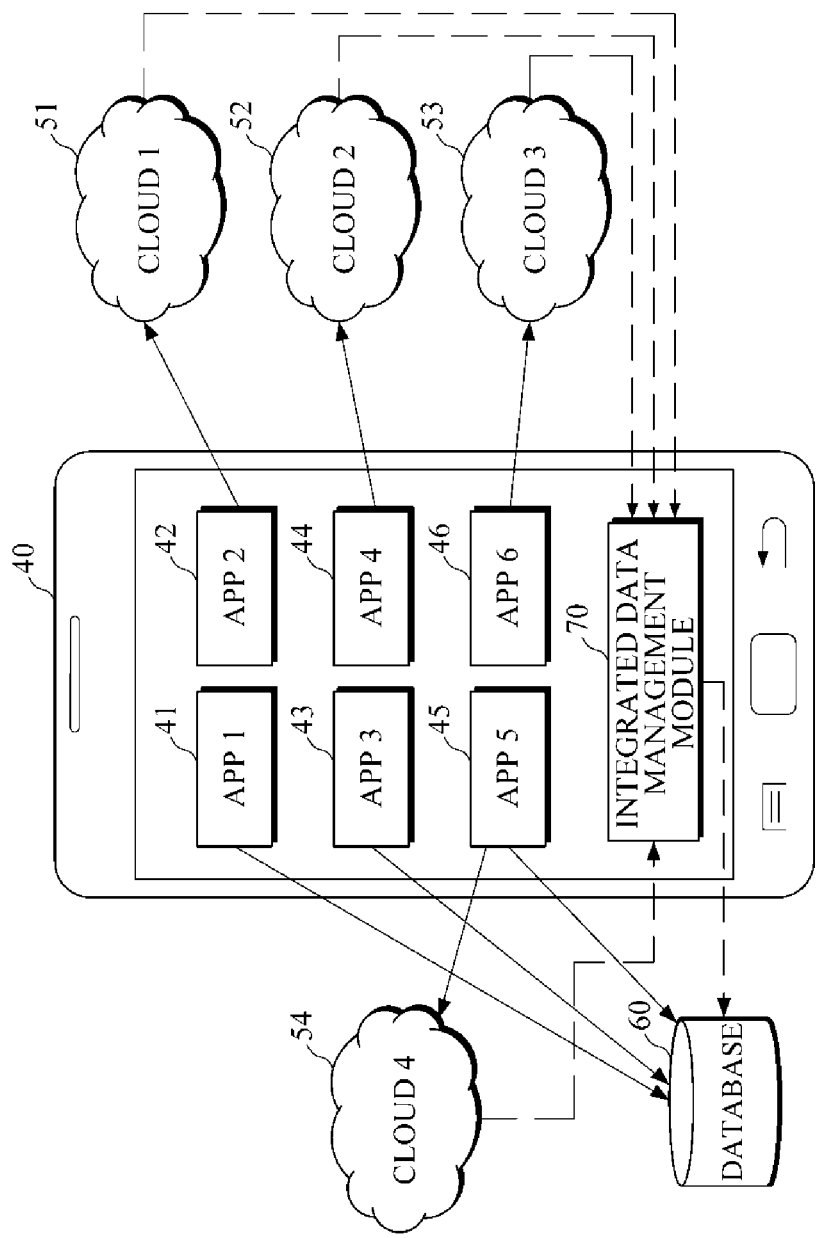
FIG. 2 is a block diagram illustrating an example of integrated management of data in a mobile device.

FIG. 2 is a block diagram illustrating an example of integrated management of data in a mobile device 40. Referring to FIG. 2, the mobile device 40 includes an integrated data management module 70. As illustrated in FIG. 2, data processed in applications 41, 43, and 45 may be stored inside or outside an external database 60, and data processed in applications 42, 44, and 46 and the application 45 may be stored in clouds 51, 52, 53, and 54, respectively.

The integrated data management module 70 collects data from each of the clouds 51, 52, 53, and 54 that store data processed in each of the applications 41, 42, 43, 44, 45, and 46 installed in the mobile device 40, and stores the collected data in the database 60 for integrated management of the data. The integrated data management module 40 may process data in a preprocessing operation to manage the collected data as integrated data, and may analyze results of the processing to create an integrated model. The created integrated model may be stored and managed in the database 60, and in response to a user's request afterwards, the integrated model may be used to provide data that satisfies the request, thereby resolving inconvenience faced by a user when executing applications or accessing clouds to obtain desired data.

Figure 3:
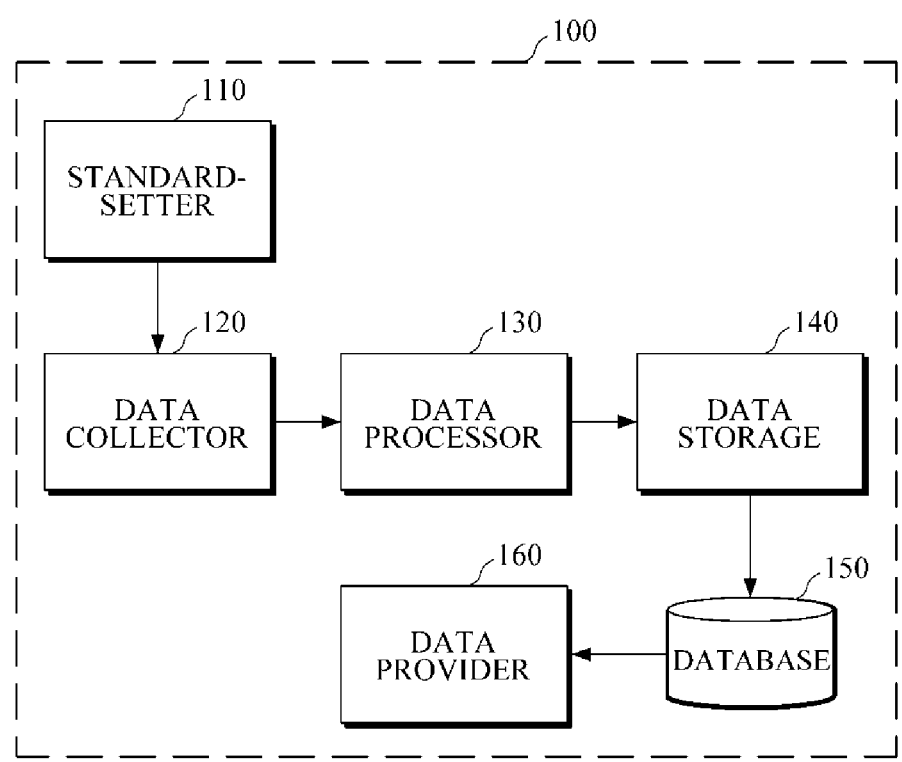
FIG. 3 is a block diagram illustrating an example of an apparatus for integrated management of data in a mobile device.

FIG. 3 is a block diagram illustrating an example of an apparatus 100 for integrated management of data in a mobile device. Referring to FIG. 3, the apparatus 100 includes a standard setter 110, a data collector 120, a data processor 130, a data storage 140, a database 150, and a data provider 160.

The standard-setter 110 sets various types of standards based on a user's input. For example, the standard-setter 110 provides a standard information interface for a user to input standard information more easily, and may set the standard information input by the user through the provided standard information interface. The standard information may include, for example, collecting-standard information for collecting data, processing-standard information for processing the collected data, and/or analyzing-standard information for analyzing the processed data.

For example, the collecting-standard information may include information of clouds to be collected, a collecting time, a collecting interval, and/or a collecting period. The information of clouds to be collected may include, for example, access information, such as names and access addresses of the clouds, and/or authentication information, such as an ID and a password. The collecting time refers to a time to collect data during a day, and the collecting period refers to a period for collecting data from data stored on the clouds. Further, the collecting time and the collecting period may be set for each cloud.

The processing-standard information may include, for example, information of standard formats and/or standard sizes for each type of data. Types of data may include, for example, emails, photos, videos, chats, calls, and/or documents, but are not limited thereto, and various types of data may be included that may be processed in the mobile device. Further, a standard format for each type of data refers to a format that is set as a standard for integrated management of data of each type. For example, if a data type is a photograph, a format selected by a user, e.g., "jpeg", among various photo formats, such as "gif", "png", "tiff", and "jpeg", may be set as a standard format. A standard size refers to a standard size of data of each type.

The analyzing-standard information may include, for example, an analysis time and analysis types. A user may set the analysis time for analyzing collected data by considering, for example, performance of the mobile device and/or a usage time of the mobile device. Further, the analysis types refer to types to be analyzed for the collected data, and may include, for example, a user preference of various types of content or data, and/or usage habits of the mobile device.

The data collector 120 collects needed data by identifying information of a collecting standard set by a user, and by accessing each cloud. For example, with respect to cloud 1, when a collecting time is set at "24:00", a collecting interval is set to be "every day", and a collecting period is set to be "one month", the data collector 120 may access the cloud 1 at 24:00 every day, using the access information of cloud 1, to collect data for a period of one month from whole data stored in the cloud 1.

Once data is collected from one or more clouds by the data collector 120, the data processor 130 preprocesses the collected data to be used for creating an integrated model. Further, the data processor 330 analyzes the preprocessed data, and creates an integrated model based on the analysis.

Figure 4:
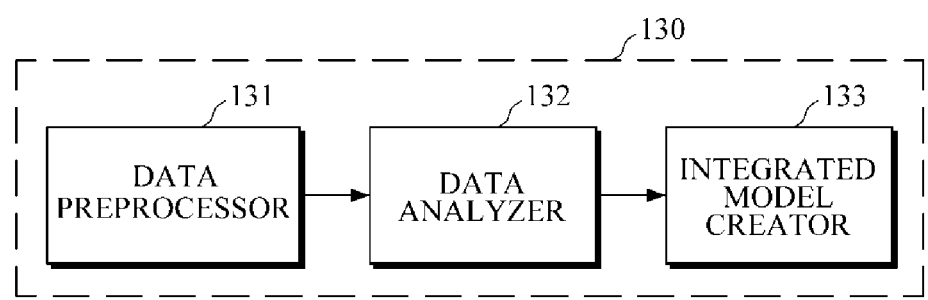
FIG. 4 is a detailed block diagram illustrating an example of a data processor.

FIG. 4 is a detailed block diagram illustrating the data processor 130. Referring to FIG. 4, the data processor 130 includes a data preprocessor 131, a data analyzer 132, and an integrated model creator 133.

The data preprocessor 131 identifies information of a processing standard set by the standard-setter 110, and processes the collected data by using the identified processing-standard information. The data preprocessor 131 may process the collected data to be used for creating an integrated model by classifying the collected data into the types of data, and converting the classified data according to the set standard format and/or standard size.

The data analyzer 132 identifies information of an analyzing standard set by the standard-setter 110, and analyzes the processed data at an analysis time, to generate results of the analysis associated with a type of analysis. For example, the data analyzer 132 may generate information of a user's characteristics, such as user preferences and user habits, by using data collected from various clouds to be processed. The information of user habits refers to usage habits of the mobile device, and may include, for example, a mobile device usage frequency, frequently used applications, and/or frequently accessed web sites. Further, the user preferences may include preferences of each content type, such as game, music, video, and book.

The integrated model creator 133 creates an integrated model that is based on the user's characteristics by applying the analysis results of the data analyzer 132, i.e., the generated information of the user's characteristics, to a predefined learning algorithm. The learning algorithm may be one or more learning algorithms predefined among various learning algorithms, such as Bayesian, support vector machine (SVM), and decision tree.

Referring back to FIG. 3, once data is collected by the data collector 120, the data storage 140 stores the collected data in the database 150. Further, once an integrated model is created by the data processor 130, the data storage 140 stores the created integrated model in the database 150. In addition, the data storage 140 may store analysis results generated by the data processor 130 in the database 150.

As described above, the database 150 may be provided inside or outside the mobile device. In a case where the database 150 is provided in the mobile device, a separate storage space to back up data may be provided in an external cloud in conjunction with the database 150.

The data provider 160 receives a user's request for data, processes data to satisfy the user's request, and provides the processed data to a user. In detail, upon receiving a user's request for data, the data provider 160 processes data stored in the database 150, i.e., data collected by the data collector 120 and/or an integrated model created by the data processor 130, to satisfy the user's request, and provides the processed data to a user. In this example, the data provider 160 may provide a user with an integrated interface that enables various types of data to be displayed on one screen, and data requested by the user may be provided through the integrated interface.

As described above, in a case where a plurality of applications, which perform an identical function or different functions, are installed in a mobile device of a user, the user may improve an environment of mobile terminals used on different application platforms. That is, various types of personal information, such as photos, calls, text messages, and emails, for example, may be stored and managed by being integrated.

For example, in a case where a user uses photographic applications A and B that are provided by different providers, photographs taken by using the applications A and B may be managed in different clouds. Accordingly, in order to check, integrate, and manage photos taken on a specific day or during a specific period, the user may need to access each cloud to download the photos in one physical space, and check the downloaded photos one by one to integrate them. However, in the examples described herein, the user may be provided with photographs taken by using the applications A and B on a specific day or during a specific period through one integrated interface without such a cumbersome process.

Further, in the examples described herein, data generated in different types of applications may be integrated. For example, if A is a photographic application, and B is an application for recording location information, information of photos taken by using A and information of locations recorded by using B may be integrated and analyzed, such that locations of the photos taken by A may be identified, and location information may be tagged to these photos. As described above, by supporting integration of different applications or different data, as well as an identical type of applications or data, a user may integrate and manage data in the mobile device, and may use the integrated data with ease and convenience.

Figure 5:
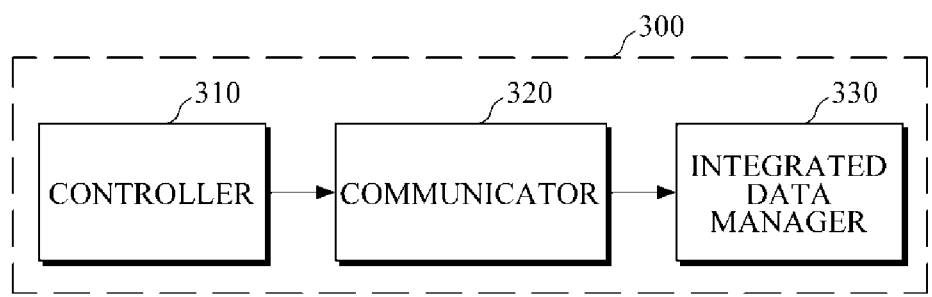
FIG. 5 is a block diagram illustrating an example of a mobile device.

FIG. 5 is a block diagram illustrating an example of a mobile device 300. In this example, the mobile device 300 refers to all types of information processing devices that are portable, including, e.g., a smartphone, a tablet PC, and/or a laptop computer, but is not limited thereto, or to only one device.

Referring to FIG. 5, the mobile device 300 includes a controller 310, a communicator 320, and an integrated data manager 330. Further, although not illustrated in FIG. 5, various sensors, such as a global positioning system (GPS), a gyro sensor, and a communication module, may be included, and the communication module may include, for example, a Bluetooth, Wi-Fi, and/or a mobile communication module.

The controller 310 controls the communication module to access an available communication network. For example, the controller 310 may control a Wi-Fi and/or a mobile communication module to access a communication network with high accessibility.

The communicator 320 is connected to a cloud through the connected communication network, and transmits and receives various types of data between the mobile device 300 and the cloud.

The integrated data manager 330 identifies information stored in a cloud to control the communicator 320 to be connected to the cloud. Upon being connected to the cloud through the communicator 320, the integrated data manager 330 collects data from the cloud. Further, the integrated data manager 330 processes the collected data to be used for creating an integrated model, analyzes the processed data, and creates an integrated model based on the analysis.

The integrated data manager 330 may output an interface to enable a user to input various types of standard information into a display of the mobile device 300. Once the user inputs the standard information, such as a collecting standard, a processing standard, and an analyzing standard, through the interface, the integrated data manager 330 may set the standard information, and may collect, process, and analyze data based on the set standard information.

Further, once a user's request for data is input, the integrated data manager 330 processes data based on the created integrated model to satisfy the user's request, and outputs the processed data to the display of the mobile device 300. In this example, once a user's request is input, the integrated data manager 330 may output an integrated interface to the display, output the data processed to satisfy the user's request to the integrated interface, and provide the data to the user.

In his example, the integrated data manager 330 may be the apparatus 100 for integrated management of data in FIG. 3. As examples thereof are described above with reference to FIGS. 1 to 3, detailed description thereof will be omitted.

Figure 6:
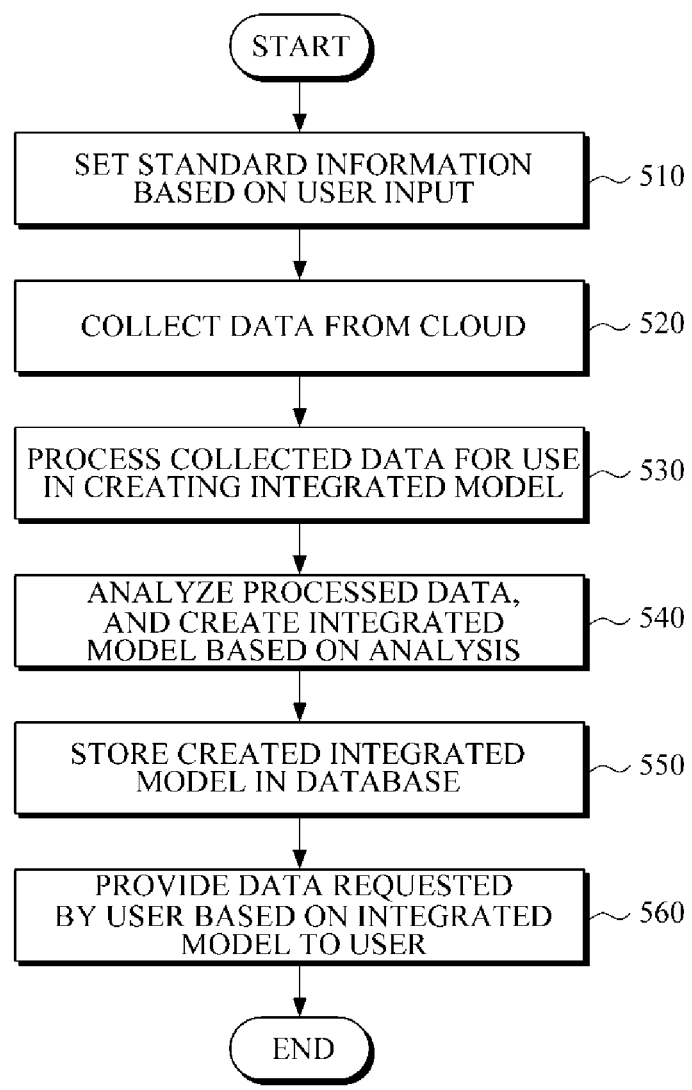
FIG. 6 is a flowchart illustrating an example of a method for integrated management of data in a mobile device.

FIG. 6 is a flowchart illustrating an example of a method for integrated management of data in a mobile device. FIG. 6 may be an example of a method performed by the apparatus 100 for integrated management of data described above with reference to FIGS. 3 and 4.

Referring to FIG. 6, in operation 510, the apparatus 100 for integrated management of data sets various types of standard information based on user input. The standard information may include, for example, collecting-standard information including information of a cloud, a collecting time, a collecting interval, and/or a collecting period; processing-standard information including information of standard formats and standard sizes of each type of data; and/or analyzing-standard information including information of an analyzing time and/or analyzing types of data.

In operation 520, upon checking the collecting-standard information, the apparatus 100 collects data from the cloud. For example, at the set collecting time and collecting interval of the cloud, the cloud may be accessed using access information of the cloud, and the data may be collected for the collecting period.

In operation 530, the apparatus 100 processes the collected data for use in creating an integrated model. For example, the collected data may be classified into data types based on the processing-standard information. Once the collected data is classified into the types of data, the collected data may be converted according to the standard formats and/or standard sizes set for each type of data.

In operation 540, the apparatus 100 analyzes the processed data, and creates an integrated model based on the analysis. For example, upon checking the set analyzing-standard information, the processed data is analyzed at the set analyzing time by using the set analyzing-standard information to generate analysis results according to the analyzing types, e.g., user preferences and/or information of user habits. Further, once the analysis results, such as information of user characteristics, user preferences and/or user habits, are generated, the analysis results are applied to a predefined learning algorithm to create an integrated model.

In operation 550, the apparatus 100 stores the created integrated model in a database. Once data is collected, the apparatus 100 for integrated management of data may store and manage the collected data in the database.

In operation 560, once a user's request for data is received, the apparatus 100 processes data to satisfy the user's request, and provides the data requested by a user based on the integrated model to the user. That is, once a user's request for data is input, data stored in the database, i.e., the collected data and/or the created integrated model, is processed to satisfy the user's request, and the processed data may be provided to the user. An integrated interface may be provided to a user so that various types of data may be provided on a screen, and the processed data may be output to the integrated interface provided to the user.

The apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for integrated management of data in a mobile device, the apparatus comprising:
   a data collector configured to collect each of a plurality of data items from a respective cloud from among a plurality of clouds, wherein each of the data items was processed by a respective application on the mobile device and stored in the respective cloud;
   a standard-setter configured to set standard information based on a user input; and
   a data processor configured to
      process the collected data items by classifying each of the collected data items into a data type among a plurality of data types, and converting at least one of the classified data items according to the standard information set for the data type of the at least one data item,
      analyze the processed data items based on user characteristic information, and
      create, based on the analysis, an integrated model for providing the data items through an integrated interface,
      wherein the standard information comprises collecting-standard information that comprises any one or any combination of any two or more of information of the clouds, a collecting time, a collecting interval, and a collecting period.

2. The apparatus of claim 1, wherein the data types comprise any one or any combination of any two or more of emails, photos, videos, chats, calls, and documents.

3. The apparatus of claim 1, wherein the data processor is further configured to:
   generate the user characteristic information, the user characteristic information comprising either one or both of user preferences and user habits, based on the processed data items.

4. The apparatus of claim 3, wherein, for the creating of the integrated model, the data processor is further configured to:
   apply the generated user characteristic information to a predefined learning algorithm to create the integrated model.

5. The apparatus of claim 1, wherein:
   for the collecting of the data items, the data collector is configured to collect the data items based on the collecting-standard information.

6. The apparatus of claim 1, wherein:
the standard information comprises processing-standard information that comprises either one or both of standard formats and standard sizes of the data types; and
for the converting of the at least one data item, the data processor is configured to convert the at least one data item to satisfy the processing-standard information.

7. The apparatus of claim 1, wherein:
the standard information comprises analyzing-standard information that comprises either one or both of a data analyzing time and a data analyzing type; and
for the analyzing of the processed data items, the data processor is configured to analyze the processed data items at every data analyzing time to generate analysis results for the data analyzing type.

8. The apparatus of claim 1, further comprising: a data provider configured to provide, in response to a data request from a user, one or more of the data items through the integrated interface using the stored integrated model.

9. A method for integrated management of data in a mobile device, the method comprising:
collecting each of a plurality of data items from a respective cloud from among a plurality of clouds, wherein each of the data items was processed by a respective application on the mobile device and stored in the respective cloud;
setting standard information based on a user input;
processing the collected data items by classifying each of the collected data items into a data type among a plurality of data types, and converting at least one of the classified data items according to the standard information set for the data type of the at least one data item;
analyzing the processed data items based on user characteristic information; and
creating, based on the analysis, an integrated model for providing the data items through an integrated interface,
wherein the standard information comprises collecting-standard information that comprises any one or any combination of any two or more of information of the clouds, a collecting time, a collecting interval, and a collecting period.

10. The method of claim 9, wherein the analyzing of the processed data items comprises:
generating the user characteristic information, the user characteristic information comprising either one or both of user preferences and user habits, based on the processed data items.

11. The method of claim 10, wherein the creating of the integrated model comprises:
applying the generated user characteristic information to a predefined learning algorithm to create the integrated model.

12. The method of claim 9, wherein:
the collecting of the data items comprises collecting the data items based on the collecting-standard information.

13. The method of claim 9, wherein:
the standard information comprises processing-standard information that comprises either one or both of standard formats and standard sizes of the data types; and
the processing of the collected data items comprises converting the at least one data item to satisfy the processing-standard information.

14. The method of claim 9, wherein:
the standard information comprises analyzing-standard information that comprises either one or both of a data analyzing time and a data analyzing type; and
the analyzing of the processed data comprises analyzing the processed data items at every data analyzing time to generate analysis results for the data analyzing type.

15. The method of claim 9, further comprising:
providing the data of the data items through the integrated interface using the stored integrated model and in response to a user request for data.

16. A mobile device, comprising:
a controller configured to control a communication module to be connected to a communication network;
a communicator configured to access one or more clouds through the connected communication network; and
an integrated data manager configured to
collect each of a plurality of data items from a respective cloud from among the one or more clouds, wherein each of the data items was processed by a respective application on the mobile device and stored in the respective cloud,
set standard information based on a user input,
process the collected data items by classifying each of the collected data items into a data type among a plurality of data types, and converting at least one of the classified data items according to the standard information set for the data type of the at least one data item,
analyze the processed data items based on user characteristic information, and
create, based on the analysis, an integrated model for providing the data items through an integrated interface,
wherein the standard information comprises collecting-standard information that comprises any one or any combination of any two or more of information of the clouds, a collecting time, a collecting interval, and a collecting period.

17. The mobile device of claim 16, wherein:
the standard information comprises any one or any combination of any two or more of a collecting standard, a processing standard, and an analyzing standard determined based on a user input, to respectively collect, process, and analyze the data items based on the respective set standard information.

18. The mobile device of claim 16, wherein the integrated data manager is further configured to:
output, in response to a data request from a user, the data of the data items to a display of the integrated interface using the created integrated model.

19. An apparatus, comprising:
a processor configured to
collect each of a plurality of data items from a respective cloud from among a plurality of clouds, wherein each of the data items was processed by a respective application on the mobile device and stored in the respective cloud,
standard information based on a user input,
process the collected data items by classifying each of the collected data items into a data type among a plurality of data types, and converting at least one of the classified data items according to the standard information set for the data type of the at least one data item,
analyze the processed data items based on user characteristic information, and create, based on the analysis, an integrated model for providing the data items through an integrated interface, wherein the standard information comprises collecting-standard information that comprises any one or any combination of any two or more of information of the clouds, a collecting time, a collecting interval, and a collecting period.

20. The apparatus of claim 19, wherein the processor is further configured to:
for the processing of the data items, process the collected data items based on any one or any combination of any two or more of the data types, formats of the data types, and sizes of the data types; and
for the analyzing of the data items, analyze the processed data items based on any one or any combination of any two or more of user preferences, user habits, and an analyzing time.

21. The apparatus of claim 19, wherein the processor is configured to:
for the creating of the integrated model, apply results of the analysis to a predefined learning algorithm to create the integrated model.

* * * * *